March 4, 1930.  A. DAVIS, JR  1,749,179
SAFETY DEVICE FOR TANKS
Filed Nov. 4, 1927  2 Sheets-Sheet 1

INVENTOR
Augustine Davis, Jr
BY
ATTORNEY

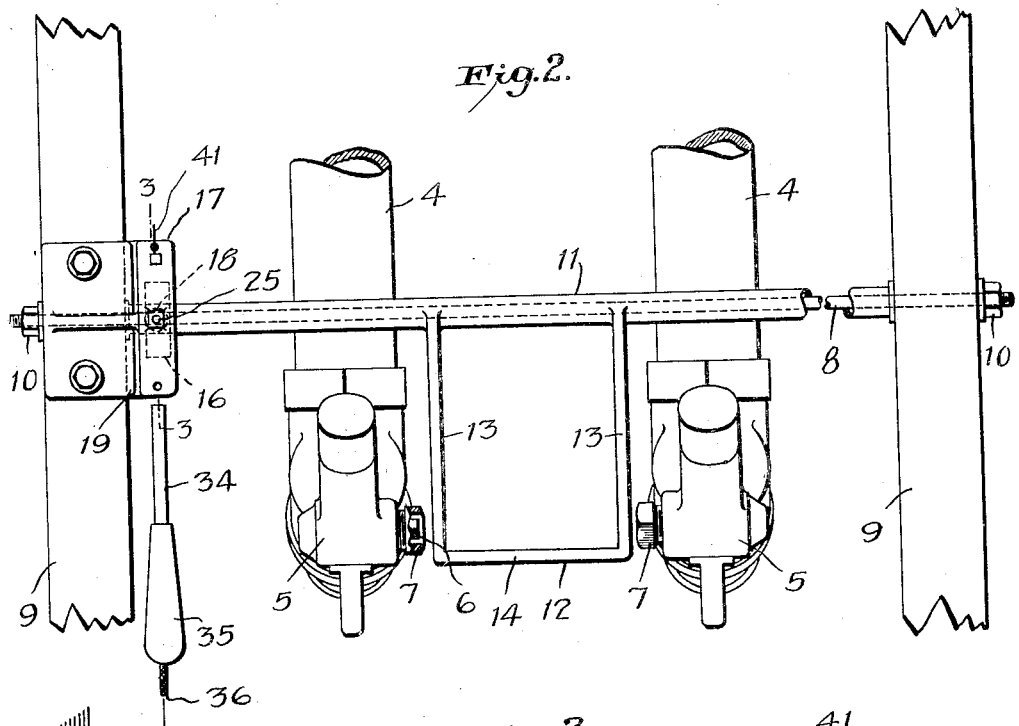
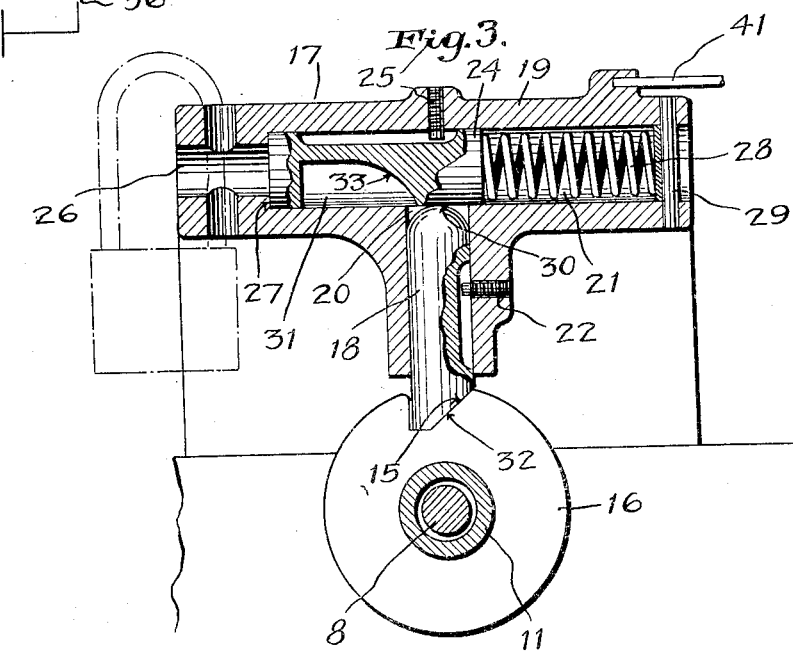

Patented Mar. 4, 1930

1,749,179

UNITED STATES PATENT OFFICE.

AUGUSTINE DAVIS, JR., OF CINCINNATI, OHIO

SAFETY DEVICE FOR TANKS

Application filed November 4, 1927. Serial No. 231,117.

The invention has reference to tanks, such as truck tanks from which deliveries of gasolene or other inflammable liquids are made, and to the faucets or external valves on or in the delivery piping of such tanks. The object is to provide a lock for preventing opening of such faucets or valves except under a safety condition, and particularly to provide means causing the tank and/or its delivery passage or passages to be electrically connected with ground when or before such faucets or valves are opened, in order to dissipate any charge of static electricity which may exist or which may be generated by the outflow of liquid, and which might ignite the liquid or its vapors.

In the accompanying drawings forming part hereof:

Fig. 2 is a plan view of parts at the rear end of the truck tank, a region intermediate the side sills being broken out and a portion of one of the faucets being in section, the view showing also the grounding device as about to be entered into the receptacle lock; and Fig. 3 is a section on the line 3—3 of Fig. 2.

Figure 1:
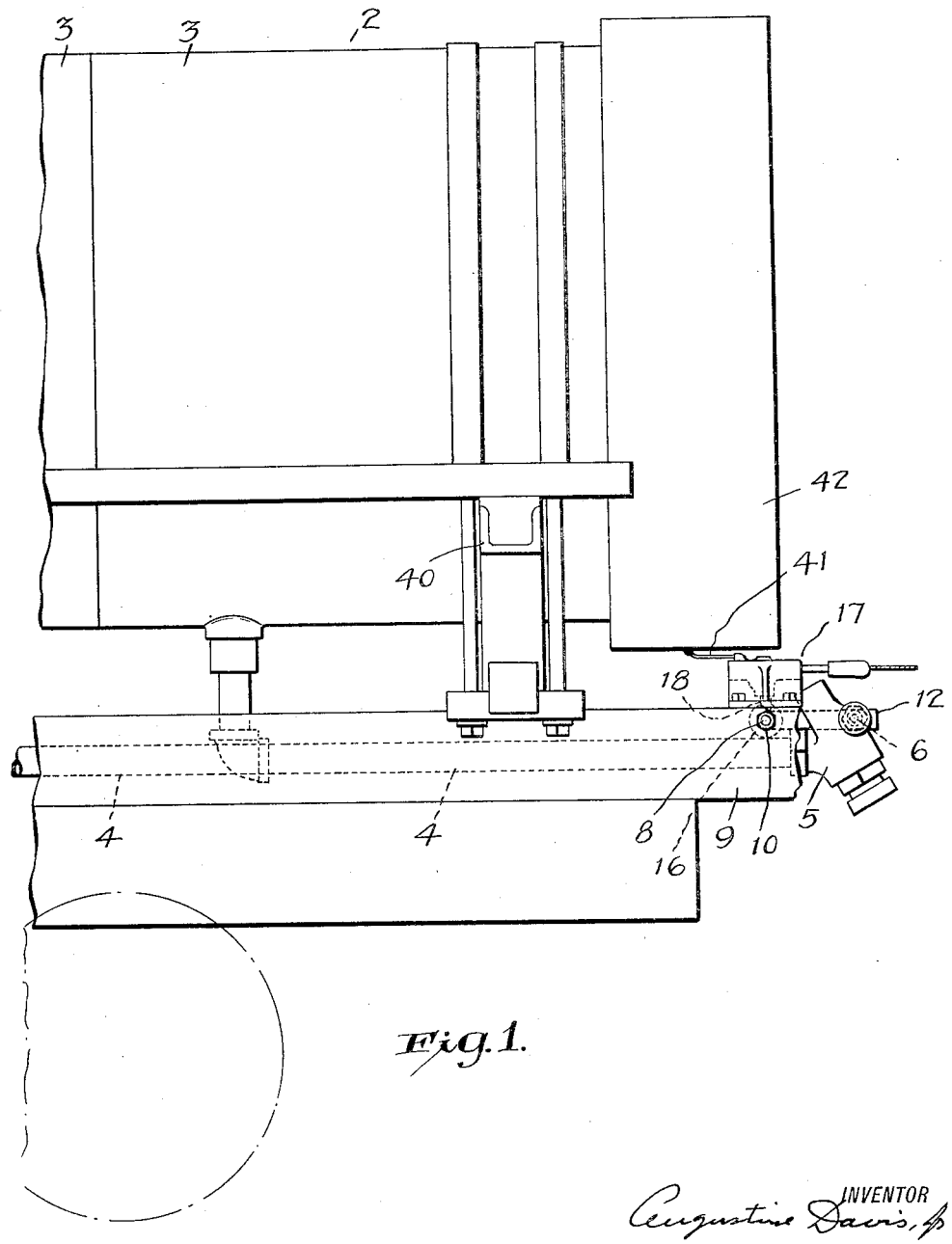
Fig. 1 is a side elevation of the rear portion of a truck-tank.

The drawing shows a truck tank 2 having a plurality of separate compartments 3. Liquid is drawn off from these compartments, through pipes or conduits 4, which may be considered as parts of the tank. In the outer portions of these pipes, or at their ends, are faucets 5 containing spring-closed valve members, which need not be illustrated since faucet valves are well known.

These faucets or valves are of the kind which are opened by a separate or detachable wrench handle, also not illustrated. Each faucet has a customary polygonal wrench-receiving element 6 operatively connected with its valve member, this element being usually surrounded by a guard 7.

The faucets lie in a row, and the faucets, in pairs, have their wrench-receiving elements facing each other.

A rod or fixed shaft 8 extends transversely of the rear end of the vehicle, parallel with the row of faucets. The rod is supported at its ends in the side sills 9 of the mounting of the tank, where it is secured by nuts 10. A hollow shaft 11 is supported rotatably or rockably on the rod, and confined against longitudinal movement by the side sills.

One or more duplex members 12 are formed with or fixed to the shaft 11, each of these members being so formed that, in one position, it projects between two faucets 5 and obstructs access to the wrench-receiving elements 6 of both. For simplicity only two faucets and one of the members 12 are illustrated, and this would be sufficient for a two-compartment tank. In a tank having a greater number of compartments and faucets, the shaft 11 will carry an appropriate number of the members 12.

The member 12 is preferably a substantially rectangular U-shaped part, having its limbs 13 united to the tubular shaft and their outer portions connected by a cross-bar 14. The spaced limbs 13 are adapted to lie in such relation to the elements 6 as to obstruct and prevent the application of a wrench handle. The member can, however, be swung or dropped down out of the way to a position which exposes or clears the elements 6, so that the wrench can then be used. The shaft 11 is turned with the movement of the member 12.

A locking device 17 cooperates with the shaft 11 to prevent the member or members 12 from being moved to unobstructing position. This locking device includes a bolt or plunger 18 which ordinarily enters a recess 15 in a collar 16 on the shaft, or cooperates with a shoulder thereon.

The form of the device may be varied. It preferably comprises a casting 19 secured to one of the side sills, the casting having two intersecting bores 20 and 21. The plunger 18 is slidable in the bore 20, where it is kept from turning by a screw 22 which enters a longitudinal slot in the plunger. In the other bore is a plunger 24 similarly kept from turning by a screw 25. One end 26 of the bore 21 is reduced to form a shoulder 27 against which the plunger 24 is normally held by a spring 28, the spring being retained by a cross-pin 29.

In this position, the rounded inner end of the bolt plunger 18 is blocked against the side of the plunger 24 at 30, and consequently the outer end of the plunger is held in projecting position where it prevents movement of the collar 16 and, therefore, of the shaft 11 and member 12.

The plunger 24, forwardly of its blocking surface, is recessed at 31 in a manner to permit the plunger 18 to recede when the plunger 24 is moved rearward against the action of the spring 28. The projecting end of the plunger 18 is sloped at 32 so that, when the member 12 and the shaft 11 are turned to a position that clears the elements 6, the sloping side of the notch 15 cams the plunger 18 upward or inward into the recess 31.

While the member 12 remains in the unobstructing position the end of the plunger 18 bears upon the periphery of the collar 16, so that this plunger is held in its inward or raised position, thereby holding the plunger 24 against being pushed forward by the spring. The rear wall 33 of the recess 31 is sloped, so that, when the member 12 is restored to the obstructing position, the plunger 24, urged by its spring, again projects the plunger into the notch 15.

The construction of the lock may, however, be varied.

The means for releasing, disengaging or unlocking the lock comprises a metal rod 34 projecting from a handle grip 35, the rod being designed to enter slidably in the socket 26. This rod is both a grounding plug and an unlocking key, and is located at a station where delivery of gasoline is to be made, being connected by a conductor cable 36 with ground, so that when the wrench-obstructing means is moved to unobstructing position, the tank, including its delivery conduits 4, is electrically connected with an actual ground, thus carrying off any static electricity from the tank or its piping, before and during the delivery of the inflammable liquid. A static charge may exist in the tank or static electricity may be generated by the friction of the outflowing stream.

It will be understood that if the side sills 9 are of metal like the cradle bolsters 40, which are secured to the sills and in turn support the tank, the lock and receptacle 17 will be thereby electrically connected with the metal of the tank and its pipes. If the sills are of wood the device 17 will naturally be connected with the tank, or with a metal part in conducting relation thereto, by a suitable conductor 41. In the drawing such a conductor is shown as connected to a metal box 42, which is united with the rear end of the tank. The grounding key remains in the receptacle during the delivery.

While a preferred and practical embodiment of the invention has been described in detail, it will be understood that there may be numerous changes in form, details and operation without departing from essentials. A locking device which is unlocked by the insertion of an electrical grounding plug and which ordinarily prevents opening of the faucets or external valves need not necessarily prevent such opening by obstructing the application of a separate operating handle.

A faucet or valve lock of the kind shown and described may have other or additional uses or applications. In this connection, attention is called to the provision of means for padlocking the lock. This is contrived in a simple manner by forming the member 19 of the locking device with alined openings 43 intersecting the entrance bore 26, through which openings the hasp of a padlock may be passed, and the padlock snapped, after which the grounding plug, or for that matter any other implement, can not be inserted to push back the plunger 24, in order to unlock the faucets.

I claim:

1. In connection with a tank having an outlet conduit leading from the lower portion of the tank, the combination with a valve in said conduit and external to the tank, a lock for preventing opening of said valve, and means adapted to be applied to release said lock and by such application to electrically ground the tank prior to the discharge of liquid from said outlet conduit.

2. The combination of a tank having an outlet passage through which liquid is withdrawn from the tank, a valve for opening and closing said passage, a part obstructing access to means by which the valve is opened, a locking device for preventing said part being moved out of the way, and electrical grounding means adapted to be applied to release said locking device and by such application to ground the tank.

3. The combination with a tank valve having connected therewith an element adapted to receive a separate handle for opening of the valve, a movable part disposed to obstruct access to said element, a locking device for preventing said part being moved out of the way, and electric grounding means adapted to be applied to release said locking device and by such application to ground the tank.

4. The combination with a tank faucet having an operating element adapted to receive a separate handle for opening the faucet, a movable part obstructing application of a handle to said element, a locking device preventing said part being moved out of the way, and electric grounding means adapted to be applied to release said locking device and by such application to ground the tank.

5. In a tank, the combination with a faucet having an element adapted to receive a separate operating handle for opening the faucet, of a turnable shaft, a member projecting from said shaft to obstruct the application of a handle to said element and being capable of being turned out of the way, and locking means cooperative with said shaft to lock said member in obstructing position.

6. In a tank having a faucet of the kind that is opened by a separate handle, side supporting members, a rod extending across between said members, a tubular turnable shaft on said rod, a member projecting from said shaft to obstruct the application of a handle to the faucet, and being capable of being turned out of the way, and locking means cooperative with said shaft.

7. In a tank having a plurality of faucets of the kind that is opened by a separate handle, a turnable member projecting between two faucets and so constructed as to obstruct access to the handle receiving portions of both, said member being mounted on a transverse axis so that it can be turned out of the way, and means for locking said member in obstructing position.

8. In a tank vehicle having a plurality of faucets of the kind that is opened by a separate handle, a turnable shaft extending adjacent the plurality of faucets, members projecting from said shaft to obstruct access to the handle receiving portions of all said faucets, and being capable of being turned out of the way, and a common means for locking all said members in obstructing position.

AUGUSTINE DAVIS, Jr.